United States Patent [19]

Kimpton et al.

[11] Patent Number: 5,399,639

[45] Date of Patent: Mar. 21, 1995

[54] METHOD FOR MANUFACTURING OF POLYMERS

[75] Inventors: Paul T. Kimpton, Northants; Philip A. Lagar, Rugby, both of Great Britain

[73] Assignee: National Starch and Chemical Investment Holding Corporation, Wilmington, Del.

[21] Appl. No.: 90,828

[22] Filed: Jul. 12, 1993

[51] Int. Cl.$^6$ .............................................. C08F 2/06
[52] U.S. Cl. .................. 526/212; 526/317.1; 526/318.2; 526/318.25; 526/318.3; 526/318.4; 526/318.43; 526/318.44; 526/318.45; 526/318.5
[58] Field of Search ............... 526/212, 318.2, 318.25, 526/318.3, 318.43, 318.44, 318.45, 317.1, 318.5, 318.4

[56] References Cited

U.S. PATENT DOCUMENTS

| | | | |
|---|---|---|---|
| 4,267,103 | 5/1981 | Cohen | 526/212 X |
| 4,513,301 | 4/1985 | Takayama et al. | 346/200 |
| 4,725,655 | 2/1988 | Denzinger et al. | 526/318.2 X |
| 4,774,303 | 9/1988 | Denzinger et al. | 526/312 |

FOREIGN PATENT DOCUMENTS 0506246 9/1992 European Pat. Off. .

OTHER PUBLICATIONS

L. Kotzeva and R. Mateva, "On the Kinetics and Mechanism of Copolymerization of Vinyl Acetate and Itaconic Monomers," Journal of Polymer Science: Part A: Polymer Chemistry, vol. 27, 1325–1332 (1989).

Primary Examiner—Judy M. Reddick
Attorney, Agent, or Firm—Ellen T. Dec

[57] ABSTRACT

A process for the polymerization of polymers of itaconic acid and vinyl acetate comprising the step of polymerizing
(i) from 10 to 95 mole percent of monomer units of the formula I:

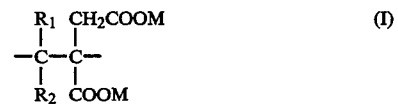

wherein each of $R_1$ and $R_2$, which may be the same or different, represents a hydrogen atom, a methyl group or an ethyl group, and M is a hydrogen atom or an alkyl ($C_1$ to $C_{18}$) chain or an organic group such as an amino containing functionality;
(ii) from 5 to 90 mole percent of monomer units of the formula II:

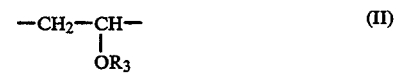

wherein $R_3$ represents a hydrogen atom or the group $-COCH_3$; and
(iii) from 0 to 45 mole percent of a ethylenically unsaturated copolymerizable comonomer, said polymerization being carried out using semi-batch polymerization procedures at a temperature of 60° to 200° C. in the presence of a substantially anhydrous alcoholic solvent.

8 Claims, No Drawings

METHOD FOR MANUFACTURING OF POLYMERS

FIELD OF THE INVENTION

The present invention is directed to a process for the preparation, at high conversion, of biodegradable polymers of itaconic acid and vinyl acetate or vinyl alcohol. Polymers made by this process are suitable for use as detergent additives, scale inhibitors and removers, sequestrants, yarn sizers, deflocculating agents, de-inking agents, suspending agents and dispersing agents.

BACKGROUND OF THE INVENTION

Processes for the preparation of polymers of itaconic acid are known in the art. However, while the prior art processes have had some impact on resolving inherent difficulties in polymerizing this dicarboxylic acid, low polymerization conversion of the acid continues to be a problem. High levels of unpolymerized monomers in the final product raise serious environmental concerns and cause significant application problems. Additionally, many of the processes are known to be difficult, erratic and inconsistent.

European Patent Application 0 506 246 published Sep. 30, 1992 describes a process for preparing polymers of itaconic acid, optionally together with acrylic acid, in water wherein the monomers(s) are neutralized to a level of 80 to 100 equivalent percent prior to or during the polymerization reaction.

The method described in the latter application has however, not been found useful in the polymerization of itaconic acid with vinyl acetate or vinyl alcohol due to poor conversion of both itaconic acid and the vinyl compound.

SUMMARY OF THE INVENTION

We have now found that polymers of itaconic acid and vinyl acetate or vinyl alcohol may be prepared efficiently and at high conversion when the polymerization is carried out using substantially anhydrous alcohol as the solvent.

Thus the present invention is directed to a process for the polymerization of
(i) from 10 to 95 mole percent of monomer units of the formula I:

wherein each of $R_1$ and $R_2$, which may be the same or different, represents a hydrogen atom, a methyl group or an ethyl group, and M is a hydrogen atom or an alkyl ($C_1$ to $C_{18}$) chain or an organic group such as an amino containing functionality;
(ii) from 5 to 90 mole percent of monomer units of the formula II:

wherein $R_3$ represents a hydrogen atom or the group —$COCH_3$; and
(iii) from 0 to 45 mole percent of a ethylenically unsaturated copolymerizable comonomer, wherein the polymerization is carried out at 60° to 200° C. in the presence of a substantially anhydrous alcoholic solvent.

It is also critical in accordance with the invention that the polymerization be carried out using a semi-batch procedure wherein all the itaconic acid is put in the initial charge and the comonomer(s) and initiator are slow added over the course of the polymerization.

The resultant polymers have a molecular weight within the range of K=10 to K=50 as measured in accordance with H. Fikentscher, Cellulosechemie 13 (1932), 60, in 1% strength solution of deionized water at 25° C. The polymers are biodegradable and show particular use as binders of divalent and polyvalent metals, and in particular as a detergency builders in detergent compositions. They are also useful as detergent additives, scale inhibitors and removers, sequesterants, yarn sizing, deflocculating agents, de-inking agents, suspending agents and dispersing agents.

DETAILED DESCRIPTION OF THE PREFERRED EMBODIMENTS

The monomers used in the polymerization process of this invention are of the formula

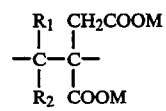

wherein each of $R_1$ and $R_2$, which may be the same or different, represents a hydrogen atom, a methyl group or an ethyl group, and M is a hydrogen atom, a ($C_1$ to $C_{18}$) alkyl group or an organic group such as an amino functionality. Monomers of this class comprise not only itaconic acid but also esters thereof such as mono- and di-methyl itaconate. It is preferred that both $R_1$ and $R_2$ represent hydrogen. This monomer is present in an amount of 10 to 95 mole percent of the polymer, preferably 40 to 80 mole percent.

The other required monomer is one of the formula

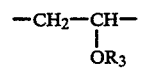

wherein $R_3$ represents a hydrogen atom or the group —$COCH_3$. The monomer is derived from vinyl acetate; however, in the polymer, it may be present in the ester form as vinyl acetate units, or in hydrolysed form as vinyl alcohol units. This monomer comprises 5 to 90 mole percent, preferably 40 to 60 mole percent of the polymer.

Optionally, up to 45 mole percent of a third comonomer may be employed. The latter comonomer comprises any compatible ethylenically unsaturated copolymerizable comonomer provided the comonomer is used in a substantially water free form. Suitable comonomers include (1) other vinyl esters including vinyl formate, vinyl propionate, vinyl butyrate, vinyl isobutyrate, vinyl valerate, vinyl 2-ethyl-heanoate, vinyl isooctanoate, vinyl nonoate, vinyl decanoate, vinyl pivalate, vinyl versatate, and the like; (2) ethylene; (3) alkyl (C4 to C18) esters of acrylic or methacrylic acid; (4) substituted or unsubstituted mono and dialkyl (C1 to C18) esters of alpha, beta-unsaturated dicarboxylic acids such as the substituted and unsubstituted mono and dibutyl, mono and diethyl maleate esters as well as the corresponding fumarates, itaconates and citronates as well as (5) other alpha, beta-unsaturated carboxylic acids such as crotonic, acrylic, methacrylic, fumaric, maleic, and citraconic acids. Methyl methacrylate, acrylic acid, methacryl ester C13 as well as mono-alkyl maleates are preferred. Chain length modifiers, such as mercaptans, may also be incorporated.

The polymerization is carried out in any substantially anhydrous (i.e., non-aqueous) alcoholic solvent. Isopropanol or normal propanol or tertiary butanol are the most preferred alcohols for use herein. While a small amount of water may be present, it is desirable to keep that level as low as possible. The alcoholic solvent is used in an amount sufficient to give an initial charge solids level of 30 to 60% by weight. The use of such a high solids level during the polymerization facilitates the production of high molecular weight polymers.

The polymerization is generally carried out at temperatures between 60° and 200° C., preferably from 60° to 160° C., and most preferably from 65° to 85° C., depending in part upon the initiator used. Conversion is substantially complete within a reaction time of about 4 to 6 hrs.

Initiators useful in the polymerization process of the invention include any soluble or partially soluble initiators which decompose within the polymerization temperature of the invention, for example: tertiary butyl peroctoate, bis (4-t-butyl cyclohexyl) peroxydicarbonate and 2,2-azo bis (2-methyl butane nitrite). The initiators may be added as a solid, but are preferably added as alcoholic solutions. The concentration of the initiator is 1 to 10%, preferably 3% to 7%, by weight of the total monomer concentration.

In accordance with a preferred embodiment, all the itaconic acid is added to the initial charge together with a portion of the initiators and the remainder of the initiator is slow added concurrently with the vinyl acetate over a period of about 3 hours with heating to about 80° C. Alternatively, a portion of the itaconic acid may be added initially and the remainder slow added over the reaction period. The reaction mass is then maintained at that temperature for a period of about 2 hours to eliminate most of the residual monomer. The mixture is then diluted with water to 30% solids, and the water alcohol mixture removed by azeotropic distillation. If desired, the resulting polymer may be neutralized with a base such as sodium hydroxide or an amine in order to meet the desired end use requirements.

The polymers prepared by the process of the invention find particular use as builders in dishwash and fabric detergents due to their ability to bind multivalent ions such as calcium.

Polymers produced by the process of this invention are also useful as detergent additives since they prevent redeposition of soil during laundering. The polymers are preferably present in the detergent compositions in an amount up to 30% by weight, more preferably in an amount of 0.1 to 20 percent by weight, and most preferably in an amount of 0.5 to 5 percent by weight. The polymers are most effective when added to detergent compositions based on: surfactants, including anionic, nonionic, zwitterionic, ampholytic surfactants and mixtures thereof; builders, including zeolites, silicates, carbonates, phosphates, perborates and mixtures thereof; and, optionally, adjuvants such as perfumes, colorants, fatty acids, fluorescent whiteners, and opacifiers. The polymers of this invention are also useful in water treatment compositions and dispersant compositions.

Additionally, the polymers produced by the process of this invention form clear, tough films, and can be applied from aqueous solutions in the sizing of yarn to impart abrasion resistance for weaving. The film is then removed from the yarn after weaving by dissolving the polymer with water. Polymers produced by the process of the present invention are also suitable as deflocculating agents for paper making. They may also be used as de-inking agents in newspaper repulping and as dispersing agents in latex paints, ceramics and glazes. The polymers may be used as suspending agents for aqueous insecticide emulsions since their adhesive properties help to hold the insecticide on the treated surface. Polymers produced by the process of the present invention may be further used as scale inhibitors and dispersants for water treatment applications and are especially useful inhibitors for barium sulfate formations in oil-well drilling applications. These polymers can also be used as dispersants for inorganic particulates, such as kaolin clay, calcium carbonate, zeolites, titanium dioxide and the like.

An additional advantage of the polymers produced by the process of this invention is that they are biodegradable. A biodegradable synthetic polymeric detergent additive is preferred since the use of non-biodegradable polymeric additives raises serious environmental concerns due to the uncontrolled build-up of polyacids.

The following examples are provided to illustrate preferred embodiments of the present invention for the production, at high conversion, of itaconic acid polymers that are biodegradable, and that improve application performance, the process being relatively easy to practice with polymerization over a shorter period of time when compared to the prior art. Unless noted, parts are by weight and temperature is degrees centigrade.

PREPARATION OF ITACONIC ACID COPOLYMERS

EXAMPLE 1

The following is a description of the preferred method of manufacture of a 50/50 mole percent vinyl acetate—itaconic acid copolymer.

Propan-2-ol (250 g), itaconic acid (130 g) and tertiary butyl perethylhexanoate (5 g) were added to a 2 liter round-bottomed flask fitted with a stirrer, condenser and thermometer and inlet ports for the addition of monomer and initiator. This was heated to 80° C. and held at this temperature for one hour.

After one hour, concurrent feeds of vinyl acetate monomer (86 g) and tertiary butyl perethylhexanoate (10 g) dissolved in propan-2-ol (60 g) were added to the reactor contents over 3 hours and 3½ hours respectively. The reaction temperature was maintained at 80° C. during these additions and for a further 2 hours after the end of the additions.

After the 2 hour hold period the propan-2-ol was removed by azeotropic distillation whilst adding water. After complete removal of the propan-2-ol, the reactor contents were cooled to below 50° C. and sodium hydroxide solution was added to raise the pH to 7–8.

This process gave a polymer solution with the following physical properties: non-volatiles 45.5%; pH 7.4; k-value (for 1% solution in water at 25° C.) of 20.

Residual itaconic acid was 0.025% and residual vinyl acetate was 0.02% as determined by standard HPLC and GC analytical methods.

EXAMPLE 2

A higher molecular weight version of the copolymer in Example 1 can be prepared by using tertiary butanol in place of propan-2-ol or by reducing the level of propan-2-ol in the reactor such that the reactor contents were as follows: propan-2-ol (100 g), itaconic acid (130 g), and tertiary butyl perethylhexanoate (5 g). With these reactor contents the process of Example 1 was repeated.

This process gave a polymer solution with the following physical properties: non-volatiles 35.6%; pH 7.3; k-value of 37.5. Residual itaconic acid was 0.04% and residual vinyl acetate was less than 0.001%.

EXAMPLE 3 (COMPARATIVE)

The composition of Example 1 was remade such that all the itaconic acid and the vinyl acetate were added continuously.

Propan-2-ol (100 g) was added to a 2 liter round-bottomed flask as described in Example 1. The flask and contents were heated to 80° C. When at 80° C. concurrent feeds of itaconic acid (130 g), dissolved in propan-2-ol (1330 g) and vinyl acetate (86 g); and tertiary butyl perethylhexanoate (15 g) dissolved in propan-2-ol (55 g) were added to the reactor contents over 3 hours and 3½ hours respectively. The reactor contents were maintained at 80° C. during these additions and for a further 2 hours after the end of these additions.

After the distillation and neutralization steps described in Example 1 a polymer solution with the following physical properties was obtained; non-volatiles 25.0%; pH=6.8; a k-value of 13. Residual itaconic acid was 2.65% and vinyl acetate was 0.09%.

The method of preparation described in Example 1 is preferred over that described in Example 3 for the following reasons:
  i) Less solvent is used,
  ii) High molecular weight copolymers can be made,
  iii) Better conversion i.e. lower residual itaconic acid levels result.

The preferred method of manufacture described in Example 1 can be used to prepare a copolymer of itaconic acid and vinyl acetate ranging in composition from 10 to 80 mole as illustrated by the results presented for Examples 4 and 5 below.

| Example | Itaconic acid mole percent | Non-volatile % | pH | K-value | Residual itaconic acid % |
|---|---|---|---|---|---|
| 4 | 14 | 34.7 | 7.9 | 13.0 | <0.001 |
| 5 | 80 | 43.1 | 7.7 | 8.5 | 1.3 |

EXAMPLE 6

The process of manufacture of Example 1 can also be used to manufacture terpolymers; for example, itaconic acid-vinyl acetate-methacrylester C13 (a $C_{13}$ ester of methacrylic acid available from Rhom-Darmstadt).

The methacrylester C13 was mixed with the vinyl acetate prior to continuous addition to the reactor. A polymer with the composition 25 (50:50 mole percent vinyl acetate:itaconic acid):1 methacrylester C13 mole ratio made using this process had the following physical properties: non-volatiles 33.5%; pH 8.0; k−value=21.0. Residual itaconic acid was 0.08%; residual vinyl acetate was 0.01% and residual methacrylester C13 was 0.04%.

EXAMPLE 7 (COMPARATIVE)

The following is a description of a 50:50 mole percent itaconic acid: vinyl acetate copolymer made using water-alcohol as a reaction medium.

Propan-2-ol (150 g), deionized water (10 g), itaconic acid (130 g) and sodium persulphate (1 g) were added to a 2 liter flask as described in Example 1. This was heated to 86° C. and held at this temperature for one hour. After the hold, concurrent feeds of vinyl acetate (86 g), sodium persulphate (7.5 g) dissolved in deionized water (50 g) and sodium metabisulphite (7.5 g) dissolved in deionized water (50 g) were added to the reactor contents over 4 hours. The reaction temperature was maintained at 86° C. during these additions and for a further 1 hour after the end of these additions.

After the 1 hour hold period the propan-2-ol was removed by azeotropic distillation whilst adding deionized water. After complete removal of propan-2-ol, the reactor contents were cooled to below 50° C. and sodium hydroxide solution was added to raise the pH of the contents of the reactor to a pH of 7–8.

This gave a polymer solution having the following physical properties: non-volatiles 50.2%; pH 5.9; k-value of 9.5; residual itaconic acid was 6.2% and residual vinyl acetate was 0.004%.

EXAMPLE 8 (COMPARATIVE)

The following process was used to make a 50:50 mole percent itaconic acid: vinyl acetate polymer. No cosolvent was used.

Deionized water (200 g), itaconic acid (130 g) and ammonium persulphate were added to a 2 liter flask as described in Example 1. This was heated to 70° and held at this temperature for one hour. After one hour, concurrent feeds of vinyl acetate (86 g), ammonium persulphate (7.6 g) dissolved in deionized water (70 g), and sodium metabisulphite (8.6 g) dissolved in deionized water (70 g) were added to the reactor over 4 hours, 4½ hours and 4½ hours respectively. The reaction temperature was maintained at 70° C. during the additions and was raised to 85° C. for one hour after the additions were completed.

This gave a polymer solution having the following properties: non-volatiles 26.9%; pH 2.4; residual itaconic acid was 6.1%.

EXAMPLE 9 (COMPARATIVE)

The process of Example 8 was repeated with the addition of a polyvinyl alcohol as a stabilizer to the reactor charge.

Deionized water (250 g), itaconic acid (43 g), Gohseran L3266 (Nippon Gohsei) (11 g) and ammonium persulphate (1 g) were added to a 2 liter flask as described in Example 1. This was heated to 70° C. and held at this temperature for one hour. After one hour concurrent feeds of vinyl acetate (173 g), ammonium persulphate (2 g) dissolved in deionized water (70 g) and sodium metabisulphite (3 g) dissolved in deionized water (70 g) were added to the reactor over 3½ hours, 4 hours and 4 hours respectively. The reaction temperature was maintained at 70° C. during the additions and was raised to 85° C. for one hour after the additions were complete.

This gave a polymer solution having the following properties: non-volatiles 16.8%, pH 2.0, residual itaconic acid was 11.0, residual vinyl acetate was 26%.

EXAMPLE 10 (COMPARATIVE)

The following experiment shows the inapplicability of the process described in EP 0 506,246 for the polymerization of itaconic acid with vinyl acetate.

Deionized water (150 g) and itaconic acid (130 g) were added to a 2 liter round bottomed flask fitted with a stirrer, condenser, thermometer and inlet ports for the addition of monomer and initiator. Sodium hydroxide 47% solution (114 g) was added to the reactor charge and the pH measured to be 4–7. This corresponds to 67% neutralized itaconic acid. Sodium bicarbonate (1 g) was added to buffer the pH. This degree of neutralization was chosen to best effect the polymerization of the vinyl acetate, nominally pH 4.5–5.5.

The polymerization then followed the procedure outlined in Example 6.

This polymer gave a polymer solution containing 32.8% non-volatiles and very high levels of unreacted itaconic acid (6.3%) and vinyl acetate (12%) indicating that this method is not suitable for manufacturing the specific itaconic acid-vinyl acetate polymers.

We claim:

1. A process for the production of polymers of itaconic acid and vinyl acetate or vinyl alcohol comprising the step of polymerizing
   (i) from 10 to 95 mole percent of monomer units of the formula I:

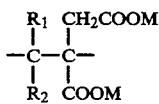

(I)

wherein each of $R_1$ and $R_2$, which may be the same or different, represents a hydrogen atom, a methyl group or an ethyl group, and M is a hydrogen atom or an alkyl ($C_1$ to $C_{18}$) chain or an organic group;
   (ii) from 5 to 90 mole percent of monomer units of the formula II:

wherein $R_3$ represents a hydrogen atom or the group —$COCH_3$; and
   (iii) from 0 to 45 mole percent of a ethylenically unsaturated copolymerizable comonomer, said polymerization being carried out in the absence of neutralization using semi-batch polymerization procedures at a temperature of 60° to 200° C. in the presence of an anhydrous alcoholic solvent.

2. The process of claim 1 wherein both $R_1$ and $R_2$ represent hydrogen.

3. The process of claim 1 wherein monomer (i) is present in an amount of 40 to 80 mole percent.

4. The process of claim 1 wherein monomer (ii) is vinyl acetate.

5. The process of claim 1 wherein monomer (ii) is present in an amount of 40 to 60 mole percent.

6. The process of claim 1 wherein the ethylenically unsaturated comonomer is selected from the group consisting of vinyl esters other than vinyl acetate, ethylene, alkyl esters of acrylic or methacrylic acid, mono and dialkyl ($C_1$-$C_{18}$) esters of alpha, beta-unsaturated dicarboxylic acids, and alpha, beta-unsaturated carboxylic acids other than those of formula (ii).

7. The process of claim 1 wherein the solvent is isopropanol or normal propanol or tertiary butanol.

8. The process of claim 1 wherein the polymerization is carried out at a temperature of 60° to 160° C.

* * * * *